United States Patent [19]

Tamura et al.

[11] 4,356,049

[45] Oct. 26, 1982

[54] METHOD OF MANUFACTURING AN ELECTRET DEVICE

[75] Inventors: Sakae Tamura, Yokohama; Hiromi Yoshida, Akatsuka Shinmachi; Takehiko Kotoh, Sagamihara; Masami Kobayashi, Tokyo, all of Japan

[73] Assignee: Tokyo Shibaura Denki Kabushiki Kaisha, Kawasaki, Japan

[21] Appl. No.: 242,166

[22] Filed: Mar. 10, 1981

Related U.S. Application Data

[63] Continuation-in-part of Ser. No. 78,838, Sep. 25, 1979, abandoned.

[30] Foreign Application Priority Data

May 25, 1979 [JP] Japan .................................. 54-64007

[51] Int. Cl.³ .......................... B32B 3/30; H04R 19/00
[52] U.S. Cl. .................................. 156/220; 29/592 E; 156/196; 179/111 E; 428/156
[58] Field of Search ................... 428/156, 179; 156/51, 156/220, 297, 196; 427/58; 179/100.41 B, 111 E; 29/592 E; 307/400

[56] References Cited

U.S. PATENT DOCUMENTS 3,949,178  4/1976  Hellström et al. ......... 179/100.41 B
3,967,027  6/1976  Igarashi et al. ..................... 428/412

FOREIGN PATENT DOCUMENTS 1340158  12/1973  United Kingdom .

OTHER PUBLICATIONS

"Electric Charge Generated in Polymethylmethacrylate by Compressive Deformation", Novikov et al., Soviet Physics–Solid State, vol. 8, No. 5, May 1966, pp. 1240-1244.

Primary Examiner—Paul J. Thibodeau
Attorney, Agent, or Firm—Oblon, Fisher, Spivak, McClelland & Maier

[57] ABSTRACT

A method of manufacturing an electret device which comprises the step of causing a pressure deformation jig whose surface is provided with numerous minute convex and concave regions to abut against the surface of a raw dielectric material for an electret and later be removed therefrom, thereby forming minute stretched and contracted region on the surface of said dielectric material.

6 Claims, 18 Drawing Figures

METHOD OF MANUFACTURING AN ELECTRET DEVICE

CROSS-REFERENCE TO RELATED APPLICATION

This application is a continuation-in-part of our copending Ser. No. 78,838, now abandoned filed Sept. 25, 1979, and assigned to the same assignee as the parent application.

BACKGROUND OF THE INVENTION

This invention relates to a method of manufacturing an electret device. The electret is defined to mean a product formed by applying permanently staying electric polarization to a dielectric material which has not spontaneous polarization.

As is well known, the electret includes the type whose piezoelectric or pyroelectric property is utilized and the type whose electrostatic field is utilized. The electrostatic type electret is applied as a source of polarization voltage for an electrostatic microphone or electrostatic headphone. Further, the electrostatic type electret is applicable to almost all apparatuses which require an electrostatic conversion from an electric to a mechanical signal or from a mechanical to an electric signal, and proves very useful.

The electrostatic conversion from an electric to a mechanical signal or from a mechanical to an electric signal is more efficiently carried out, as the polarization voltage is increased. It is considered important for the steady performance and uniform quality of the aforesaid apparatuses that the electrets used with the same type of apparatus should have the high and equal level of voltage. Further, since the life of the electric charge of an electret is a factor directly determining the useful life of the apparatus using said electret, it is another important requirement that all the electrets produced should have a long life alike.

The known processes of manufacturing such an electret as can meet the above-mentioned requirements fundamentally include (1) the thermal electret-forming process, (2) the electric electret-forming process, (3) the mechanical electret-forming process, (4) the photographic electret-forming process, (5) the radiation electret-forming process, (6) a magnetic electret-forming process, and various combinations thereof.

The thermal electret-forming process and electric electret-forming process can easily control the degree of the polarization or electric charge and consequently the voltage level of an electret, and are already industrially applied. However, these processes are not fully satisfactory in respect of stability and life from the practical point of view.

Further for improvement of stability and life, it was proposed (the British Pat. No. 1,340,158) to supply an electric charge to the surface of a dielectric material which was provided with minute convex and concave portions, thereby forming said dielectric material into an electret. However, this proposed electret still failed to display a fully satisfactory performance from the practical point of view.

The surface of an electret formed by any of the prior art electret-forming processes contained an unstable charge. Therefore, it was considered indispensable to carry out a stabilizing process for the elimination of an unstable electric charge (as set forth in the Japanese disclosed patent application No. 43999, 1972 and the Japanese patent publication No. 19360, 1975).

SUMMARY OF THE INVENTION

It is accordingly the object of this invention to provide a method which can manufacture an electret having a long life and uniform surface potential without the necessity of subsequently carrying out a stabilizing process.

To attain the above-mentioned object, this invention provides an electret device-manufacturing method which comprises the step of plastically deforming the surface of raw dielectric material for an electret to provide minute stretched and compressed regions on said surface. These stretched and compressed regions are formed simply by pressing a pressure deformation jig having numerous minute convex and concave portions on the surface against the surface of the raw dielectric material and then removing said jig therefrom.

When the electret device of this invention is put to practical application, a conductive member is fitted to the opposite side of the dielectric material to that on which the stretched and compressed regions are formed. In this case, it is preferred to form said minute stretched and compressed regions on the surface of the dielectric material, after it is laminated with a conductive member, by pressing the jig having numerous minute convex and cancave portion against the surface of said dielectric material and then removing said jig therefrom.

According to a preferred embodiment of the invention, there is provided a method of manufacturing an electret device, which comprises the steps of:

laminating a conductive member with a tetrafluoroethylene-hexafluoropropylene copolymer film; and later causing a pressure deformation jig whose surface is provided with numerous minute convex and concave regions to abut against the surface of said dielectric copolymer film with a pressure of 100 to 750 kg/cm² to thereby plastically deform the dielectric film in forming minute stretched and compressed concave and convex regions; and removing said jig from the surface of the dielectric film.

In this embodiment, said dielectric film may be laminated with a thickness of 50–150 microns, and said jig may be provided with a pressure deformation surface having 2000–7500 minute convex and concave regions per square centimeter.

DETAILED DESCRIPTION OF THE PREFERRED EMBODIMENTS

Figure 1:
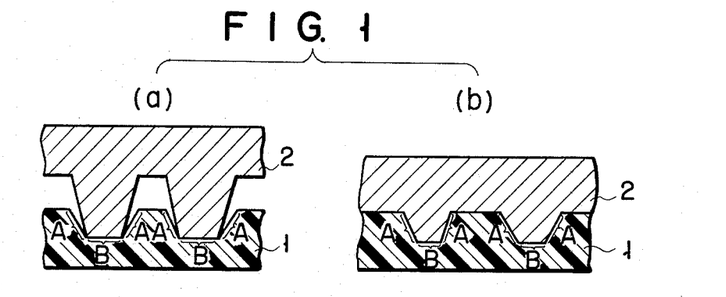
FIGS. 1(a) and 1(b) are sectional views showing the step of forming minute stretched and compressed region on the surface of a raw dielectric film for an electret.

According to the method of this invention, minute stretched regions (A) and compressed regions (B) are dispersively formed on the surface of a raw dielectric film 1 for an electret as shown in the sectional views of FIGS. 1(a) and (b) by pressing a pressure deformation jig 2 provided with numerous minute convex and concave portions against said surface and removing said jig therefrom. It has been discovered that an extremely stable electric charge is held in the minute stretched regions (A) and compressed regions (B).

The generation of said stable electric charge is assumed to arise from the local change of the molecular configuration or conformation of a raw dielectric material for an electret which is caused by the forceful abutment of the pressure deformation jig 2 against the surface of said dielectric material and the removal of said jig 2 therefrom.

A raw dielectric material for an electret used in the method of this invention includes a copolymer of tetrafluoroethylene and hexafluoropropylene (hereinafter referred to as "FEP Teflon"), polytetrafluoroethylene, polyperfluoroalkoxide. Further, any of raw dielectric materials such as polyethylene terephthalate, polyimide, polyvinyl chloride and polyvinylidene fluoride may be laminated with any of another group of raw dielectric materials such as FEP Teflon and polytetrafluoroethylene. In this invention, the most preferred raw dielectric material is FEP Teflon. The pressure deformation jig well serves the purpose, provided it has a different charged tendency from that of the raw dielectric material for an electret. For practical purpose, it is preferred to use a metal mold having, for example, a plated surface. The level of the electret voltage can be easily controlled by properly selecting the kind of material being plated on the surface of the pressure deformation jig.

Figure 2:
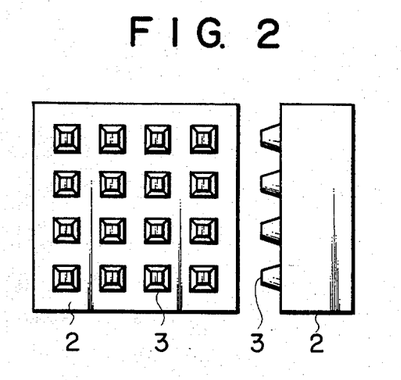
FIG. 2 and FIGS. 3(a) to 3(h) indicate the structures of pressure deformation jigs used in this invention.
Figure 3A:
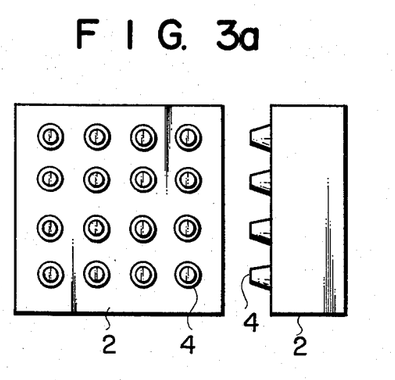

The numerous minute convex portions formed on the surface of the pressure deformation jig 2 are shaped, for example, like square trapezoidal protuberance 3 as seen from FIG. 2 showing the plan view and side view of said jig 2 or round conical protuberance 4 as indicated in FIG. 3(a). The convex portions of the jig 2 may take any other desired form such as an angular columnar protuberance 5 (FIG. 3(b)), a semispherical protuberance 6 (FIG. 3(c)), a semielliptic protuberance 7 (FIG. 3(d)), a spiral protuberance 8 (FIG. 3(e)), or a concentric protuberance 9 (FIG. 3(f)), provided the jig 2 can plastically deform the surface of a raw dielectric material for an electret to provide stretched and compressed regions on said surface.

Figure 3B:
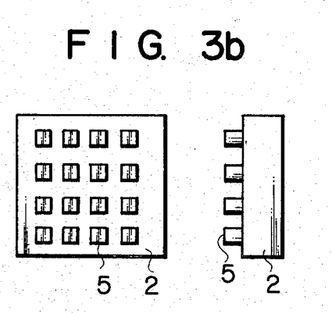
Figure 3C:
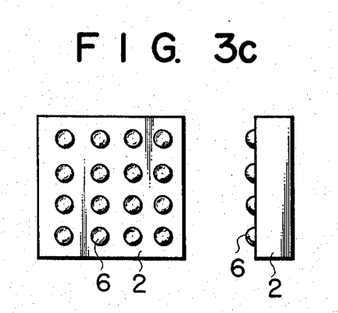
Figure 3D:
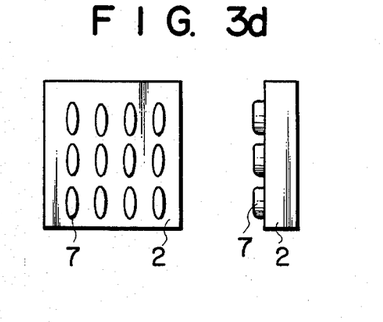
Figure 3E:
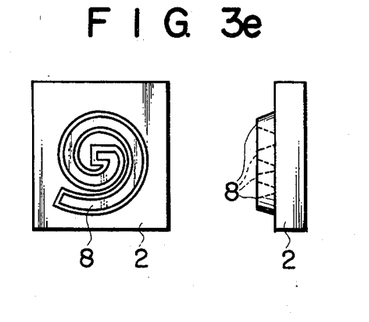
Figure 3F:
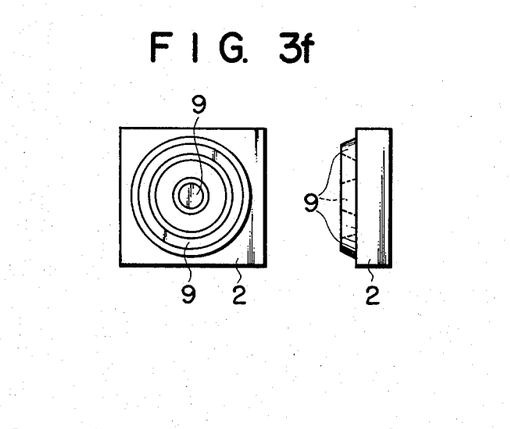
Figure 3G:
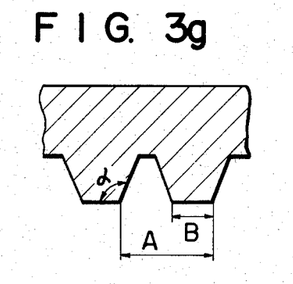

Referring to FIG. 3g showing the cross sectional shape of the pressure deformation jig 2, $\alpha$ denotes the degree in which the wall of the projection is inclined. Stretched and compressed regions are formed in the surface of a FEP Teflon film with which aluminum sheet is laminated by mean of a plurality of pressure deformation jigs having different levels of the above-mentioned inclination angle. Measurement was made of the resultant surface potential Vo (v) of the electret samples. The samples were allowed to stand for 3000 hours at a temperature of 60° C. and relative humidity of 95%. Determination was made of the percentage of those of the samples which were retained within −2 dB of the initial potential, the results being set forth in the following table.

TABLE

| Jig No. | Angle of inclination $\alpha(°)$ | Number of samples (A) | Average value of surface potential (v) | Number (B) of the electret samples which were retained within −2 dB of the initial potential after allowed to stand for 3000 hours at 60° C. and relative humidity of 95% | B/A × 100 (%) |
| --- | --- | --- | --- | --- | --- |
| 1 | 95 | 100 | −800 | 81 | 81 |
| 2 | 99 | 100 | −790 | 93 | 93 |
| 3 | 102 | 100 | −830 | 92 | 92 |
| 4 | 114 | 100 | −810 | 90 | 90 |
| 5 | 120 | 100 | −810 | 87 | 87 |
| 6 | 30 | 100 | −500 | 48 | 48 |

As seen from the above table, where the inclination angle of the projection of the pressure deformation jig falls within the range of 95° to 120°, the surface potential Vo is subject to little deterioration, therefore said jig is adapted to be used in this invention. The pressure deformation jig of jig No. 6 is a rasor-like blade and renders the surface potential Vo of the electret ready to deteriorate and also causes the FEP Teflon film to be easily broken. Therefore, said pressure deformation jig is unadapted to be used in this invention.

Referring to FIG. 3g, experiments show that the electrets formed by jigs in which $(A-B)^2/B^2$ has a value ranging from 5 to 16 are preferred for the object of this invention, because said electrets are little subject to deterioration.

Figure 3H:
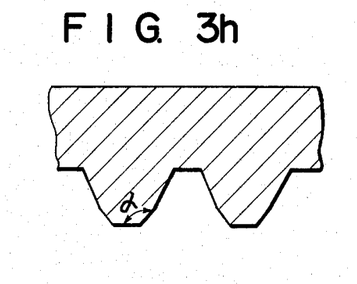

A pressure deformation jig (FIG. 3h) whose projection has its shoulder portion scraped off does not give rise to the breakage of the FEP Teflon film even of made this, making it possible to increase a number of projections per surface area of the FEP Teflon film, offering great advantage in producing an electret having a high surface potential.

There will now be studied the effect exerted on the surface potential of the electret by changes in the density or number of the dispersed minute convex and concave portions of the pressure deformation jig, the pressure with which the jig abuts against the surface of a raw dielectric material for a electret, and the thickness of said dielectric material.

Figure 4:
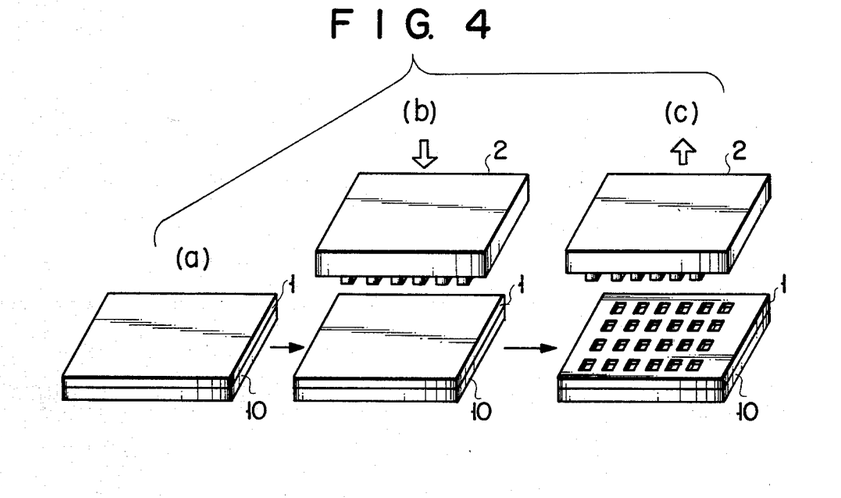
FIG. 4 is an oblique view showing the step of forming an electret embodying this invention.
Figure 5:
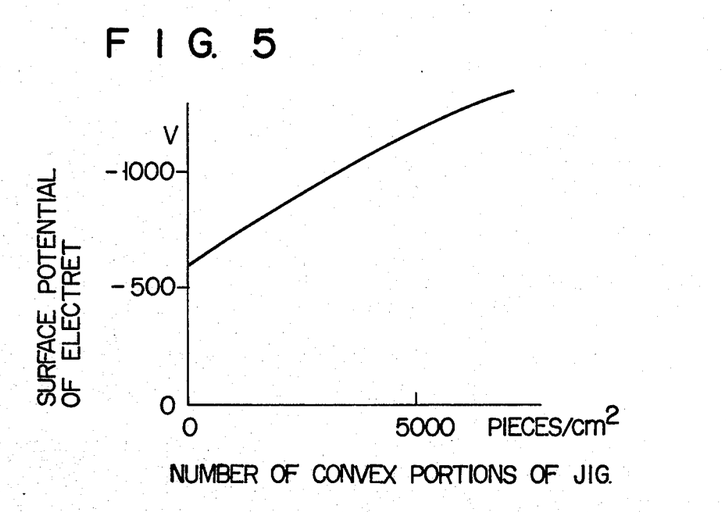
FIGS. 5 to 7 are curve diagrams showing the property of an electret formed by the method of the invention.
Figure 6:
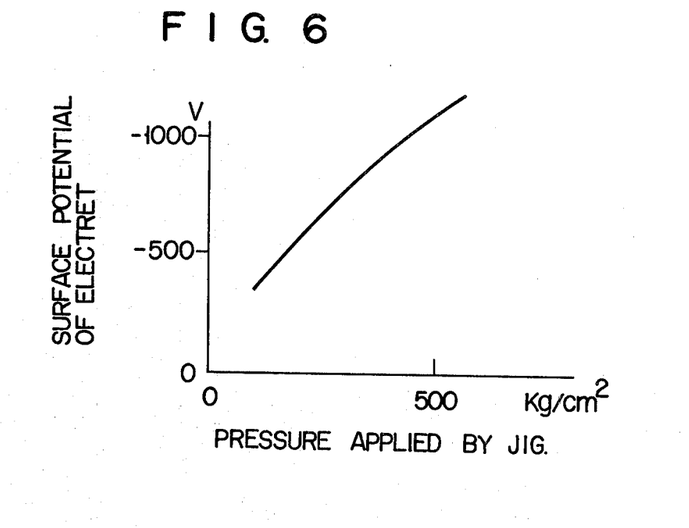
Figure 7:
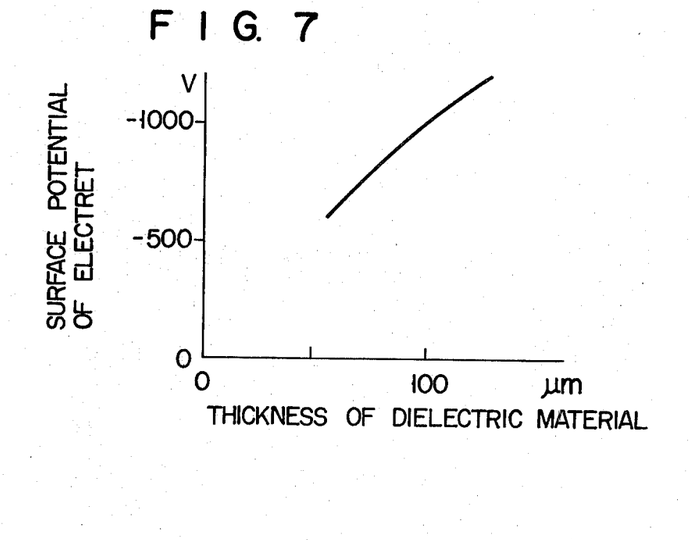

As seen from FIG. 4(a), a raw dielectric film of FEP Teflon for an electret an electret is formed on an aluminum substrate 10. Next as shown in FIG. 4(b), the pressure deformation jig 2 whose minute convex portions are shaped as illustrated in FIG. 2 is made to abut against the surface of a raw dielectric film 1 for an electret and then removed from said surface, thereby producing an electret comprising minute stretched and compressed regions as shown in FIG. 4(c). Measurement was made of the effect which was exerted on the surface potential of an electret by changes in the density or number of the minute projections dispersed over the surface of the pressure deformation jig 2, the results being set forth in FIG. 5. Measurement was made in the same manner as described above of the effect which was exerted on the surface potential of an electret by changes in the face of pressing the jig 2 against the surface of the raw dielectric film for an electret and also in the thickness of said dielectric material, the results being indicated in FIGS. 6 and 7. Referring to FIG. 5, measurement was made by varying the density or number of the dispersed minute convex and concave portions of the jig 2, with the other items kept unchanged. Referring to FIG. 6, measurement was made by varying the force of pressing the jig 2 against the surface of the raw dielectric film for an electret, with the other items kept unchanged. Referring to FIG. 7, measurement was made by varying the thickness of the raw dielectric film for an electret, with the other items kept unchanged.

FIGS. 5, 6, and 7 show that within the range where the surface of a raw dielectric film for an electret can be plastically deformed to form minute stretched and compressed portions, the surface potential of said dielectric film was more elevated according to an increase in the number of the dispersed minute convex and concave portions of the jig 2, that is, the minute stretched and compressed portions formed on the surface of said dielectric film, the force of pressing the jig 2 against the surface of the dielectric film, and the thickness thereof.

The density or number of the dispersed minute convex and concave portions of the jig 2, the force of pressing the jig 2 against the surface of the dielectric film, and the thickness thereof are selected in accordance with the required surface potential of an electret and the kind of a raw dielectric material for an electret. Where an electret (surface potential $|200| \sim |1500|$ V) for an electro-acoustic transducer is made of, for example, FEP Teflon, then it is preferred for practical purposes to set the density or number of the dispersed minute convex and concave portions at 2000 to 7500 pieces/cm$^2$, the force of pressing the jig against the surface of the raw dielectric film at 100 to 750 kg/cm$^2$ and the thickness of said film at 50 to 150 microns, and, if need arises, to properly combine these factors.

In the case of, for example, an electret having a surface potential of 500 to 1000 V for use with a headphone, it is preferred to use a pressure deformation jig 2 provided with minute convex and concave portions shown in FIG. 2, to set the density or number of the dispersed minute convex and concave portions of the jig at 5500 to 6000 per cm$^2$, the jig-pressing force at 300 to 600 kg/cm$^2$ and the thickness of the raw dielectric FEP Teflon film for an electret at 50 to 100 microns.

In the case of an electret having a surface potential 200 to 600 V for use with a microphone, it is preferred to set the density or number of dispersed minute convex and concave portions of the jig at 5500~6000 per cm$^2$, the jig-pressing force at 100~300 kg/cm$^2$ and the thickness of the raw dielectric FEP Teflon film at 50 to 100 microns.

In the case of an electret having a surface potential 300 to 800 V for use with a pickup cartridge, it is preferred to set the density or number of dispersed minute convex and concave portions of the jig at 2000 to 3000 per cm$^2$, the jig-pressing force at 200 to 600 kg/cm$^2$ and the thickness of the raw dielectric FEP Teflon film at 100 to 150 microns.

Depending on the kind of a raw dielectric material for an electret, it is practically possible to select the velocity of pressing the jig against the surface of said dielectric material and the condition in which said dielectric material is heated, within the range which does not fall outside of the object of this invention.

There will not be studied the stability (life) of an electret manufactured by the method of this invention (example). Comparison was made between the surface potential of the FEP Teflon electret of the invention and that of a raw surface-roughened dielectric material for an electret (control) fabricated by the prior art termal process without forming stretched and compressed portions by previous local melting cutting or casting, the results being set forth in FIG. 8.

Figure 8:
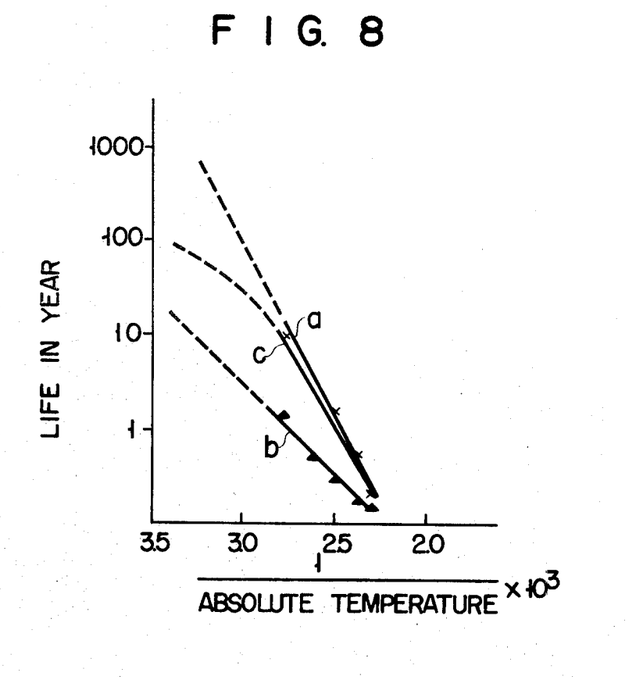
FIG. 8 is a curve diagram showing the property of the electret of the invention compared with that of a control.

In the above-mentioned comparison, the example was formed of a raw FEP Teflon dielectric film for an electret having a thickness of 75 micron. A pressure deformation jig provide with minute convex and concave portions as shown in FIG. 2 (the density or number of the dispersed minute convex and concave portions was set at 7000 pieces/cm$^2$) was pressed at 400 kg/cm$^2$ against the surface of said FEP Teflon dielectric film and later was removed from said surface. The control was formed of a raw FEP Teflon dielectric film for an electret which was cast into the same shape as the electret of the example and was made to have the same surface potential as the example by corona discharge. The measured life of both types of electret is indicated in the length of time (year) required for the initial potential of both electrets to be attenuated by the extent of $-3$ dB. The curve (a) of FIG. 8 represents the example, and the curve (b) denotes the control. FIG. 8 shows that the electret of this invention had its life noticeably extended and the stability of its electric charge prominently improved. The curve (c) shows the life of an electret, against the surface of which the pressure deformation jig (provided with the minute convex portions shaped as shown in FIG. 3(b) or 3(c)) was made to abut, and which was supplied with the same surface potential as the example.

As mentioned above, the method of this invention has elevated the property of an electret by plastically deforming the surface of a raw dielectric material for an electret by the pressure deformation jig to provide minute stretched and compressed regions on said surface. However, the electret of the invention proves effective, even when supplied by different means from the pressure deformation jig with an extra electric charge in addition to the electric charge already generated on the surface of a dielectric material by the abutment of the jig against said surface and its removal therefrom. Further, the present electret still retains its efficacy even when supplied by different means from the pressure deformation jig with a new form of electric charge after the elimination of the electric charge previously produced by the abutment and removal of the pressure deformation jig. Namely, for the object of this invention, it is possible, for example, to offset a negative electric charge previously generated on the surface of a dielectric material by the abutment and removal of the pressure deformation jig with a positive charge produced, for example, by a corona discharge or ion implantation and eventually cause the electret to be supplied with a positive charge by applying a further amount of a positive charge after the offset of the previously produced negative charge. The electret of this invention also displays a desired effect when a voltage is impressed between the pressure deformation jig 2 and the conductive substrate 10 partly consituting the electret device during the abutment of said jig against the surface of the dielectric material and its removal therefrom.

Figure 9:
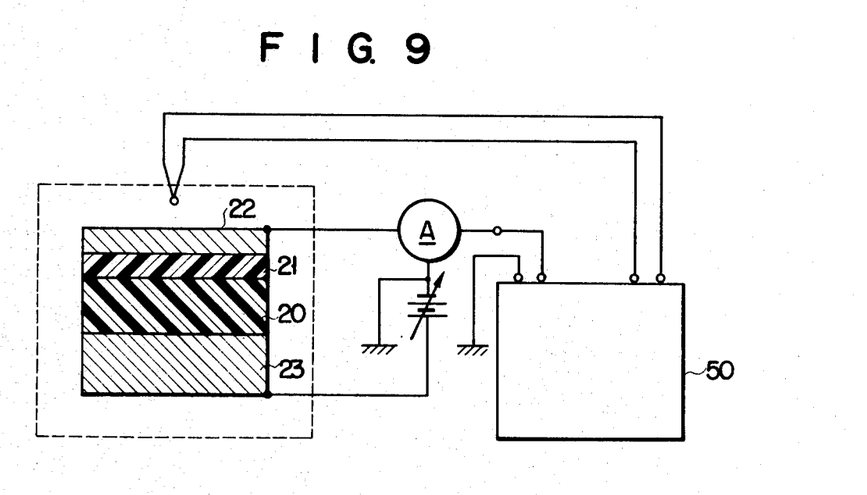
FIG. 9 schematically indicates the arrangement of a thermally stimulated of excited current-measuring apparatus.
Figure 10:
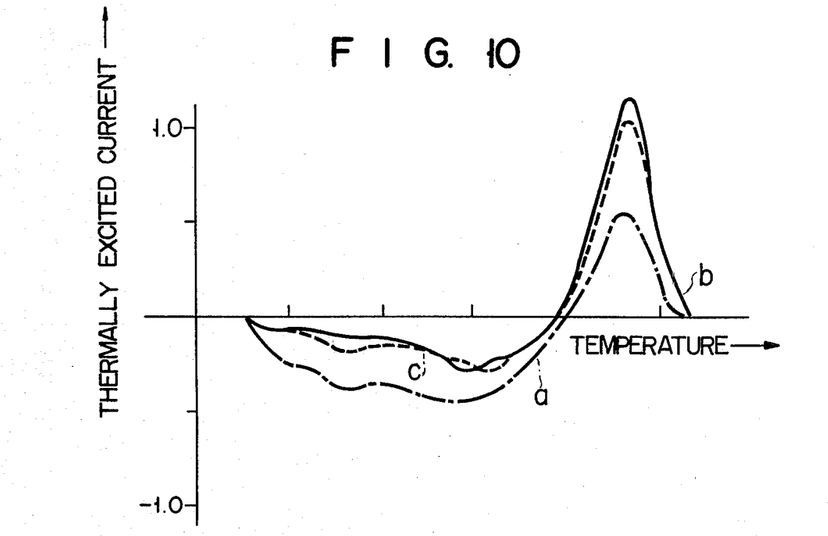
FIG. 10 is a curve diagram of the spectrum of a thermally stimulated or excited current occurring in an electret embodying this invention compared with that of the prior art electrets.

Determination was made of the stability of an electric charge generated on the surface of a raw dielectric material for an electret by applying a thermally stimulated current-measuring apparatus shown in FIG. 9. Reference numeral 50 denotes a recorder. In this experiment, an FEP Teflon film 20 was provided which was formed into an electret without convex and concave portions. A kapton film 21 (the trademark of Dupont's polyimide film) was mounted on the FEP Teflon film 20. Electrodes 22, 23 were electrically connected together. Measurement was made of a current flowing through a short circuit, while temperature was progressively increased at the prescribed rate. As a result, a spectrum (curve (a) of FIG. 10) of a thermally stimulated current was obtained. Experiment was also made with an electret formed of an FEP Teflon film provided with numerous minute convex and concave regions by the abutment and removal of a metal pressure deformation jig in accordance with the method of this invention. A thermally stimulated current running through said surface-roughened electret embodying the invention indicated a spectrum represented by a curve (b) of FIG. 10. After the measurement of the spectrum (curve (b)) of a thermally stimulated current (after the removal of the electret charge produced by the method of this invention), the aforesaid dielectric material was again electrically made into an electret. The thermally stimulated current passing through the electret thus formed showed a spectrum illustrated by the curve (c) of FIG. 10. FIG. 10 shows that electrets having the same surface potential indicate different degrees of stability of electric charge. In other words, FIG. 10 proves that the electret prepared by the method of this invention has a far higher stability of electric charge (as indicated by the curves (b), (c)) than that of the prior art electret (as illustrated by the curve (a)).

Figure 11:
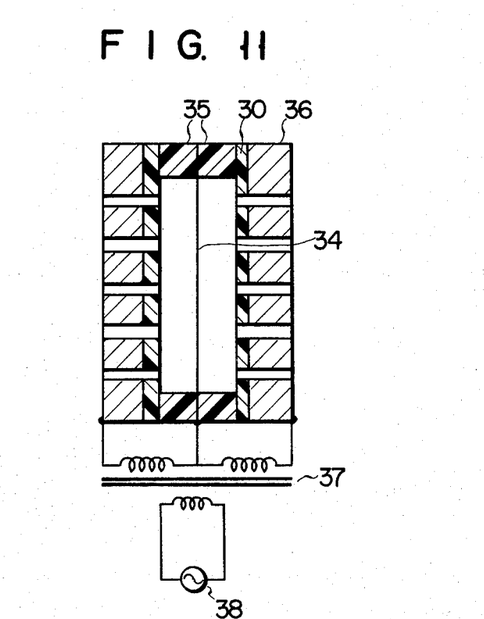
FIG. 11 schematically shows the arrangement of an electrostatic head phone using the electret of the invention.

Another important advantage of the method of this invention for manufacturing an electret which comprises the step of forming minute convex and concave regions on the surface of a raw dielectric material is that the surface of the electret, though provided with minute convex and concave portion, has prominently great flatness as macroscopically viewed. The reason for this is as follows, the main application of the electret is now in an electrostatic microphone and electrostatic headphone. Where an electret is used with an electrostatic headphone, a distance between the surface of the electret 30 and a vibrating electrode 34 should preferably be as short as possible in order to elevate the electro-acoustic conversion rate. Should the surface of the electret 30 touch the vibrating electrode 34 during the operation of an electrostatic headphone, then its property would be extremely deteriorated with the pressible damage of the headphone itself. Therefore, it is demanded to use an electret whose surface, though provided with minute convex and concave portions, indicates great flatness as macroscopically viewed.

With the method of this invention, the great flatness (as macroscopically viewed) of the surface of the pressure deformation jig, though provided with minute convex and concave portions, enables similar minute convex and concave regions to be provided on the surface of a dielectric material with as great surface flatness as is realized in the embossment operation, even if the dielectric material previously has an uneven surface. If, therefore applied in a state arranged as shown in FIG. 11, the electret thus formed provides a stable electrostatic electro-acoustic transducer. Referring to FIG. 11, reference numeral 35 denotes a spacer; 36 a fixed electrode (conductive substrate); 37 a transformer; and 38 a source of acoustic signals.

As described above, the method of this invention offers the advantages that an electret having an extremely stable electric charge can be produced without the electric charge-stabilizing process which has been indispensable for the prior art electret-manufacturing practice, thereby prominently extending the electret life; the desired electret can be easily fabricated by pressing a pressure deformation jig whose minutely roughened surface has great flatness as macroscopically viewed against the surface of a raw dielectric material for an electret and removing said jig therefrom, thereby simplifying the manufacturing steps, and elevating quantity production; the distribution of an electric charge over the surface of the electret can be easily controlled by the density with which the minute convex and concave regions are dispersed over the surface of the electret, thereby enabling the electret to have a uniform surface potential; and the surface potential of the electret can also be easily controlled by properly selecting the kind of a raw dielectric material for an electret, the kind of materials constituting the pressure deformation jig and the level of pressure with which said jig is let to abut against the surface of the raw dielectric material for the electret.

What we claim is:

1. A method of manufacturing an electret device, which comprises the steps of:
    laminating a conductive member with a dielectric polymer film; and later causing a pressure deformation jig whose surface is provided with plural projections defining numerous minute convex and concave regions to abut against the surface of said dielectric polymer film with a pressure of 100 to 750 kg/cm$^2$ to thereby plastically deform the dielectric film in forming minute stretched and compressed concave and convex regions, said projections having walls inclined at an angle a, wherein 95°<a<120°; and
    removing said jig from the surface of the dielectric film.

2. The method according to claim 1, wherein:
    said conductive member is laminated with said dielectric polymer film having a thickness of 50-150 microns, and
    said jig is provided with a pressure deformation surface having 2000-7500 minute convex and concave regions per square centimeter.

3. The method according to claim 1, further comprising:
    irradiating positively charged particles on the surface of the dielectric polymer film which is provided with the minute stretched and compressed regions and is negatively charged beforehand, thereby causing said surface to be eventually positively charged.

4. The method according to claim 1 wherein said dielectric polymer film comprises:

a tetrafluorethylene-hexafluoropropylene copolymer film.

5. The method according to claim 1, wherein said dielectric polymer film comprises:
a polymer selected from the group consisting of polytetrafluorethylene and polyperfluoroalkoxide.

6. The method according to claim 1, wherein said dielectric polymer film comprises:
a polymer selected from the group consisting of polyethylene terephthalate, polyimide, polyvinyl chloride and polyvinylidine fluoride laminated with a polymer selected from the group consisting of tetrafluoroethylene-hexafluoropropylene and polytetrafluoroethylene.

* * * * *